A. P. LITTLE.
PHOTOMETER.
APPLICATION FILED SEPT. 8, 1917.
1,288,067.
Patented Dec. 17, 1918.
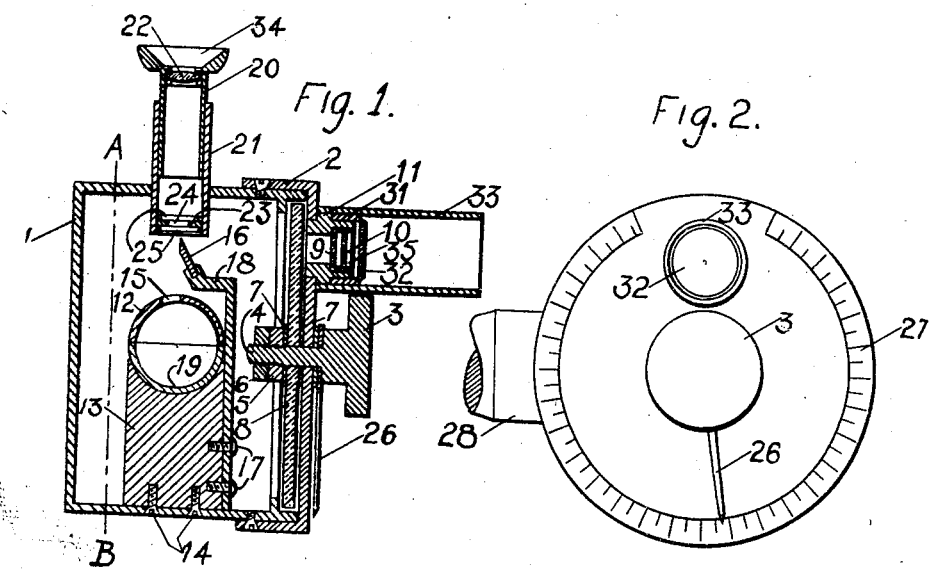
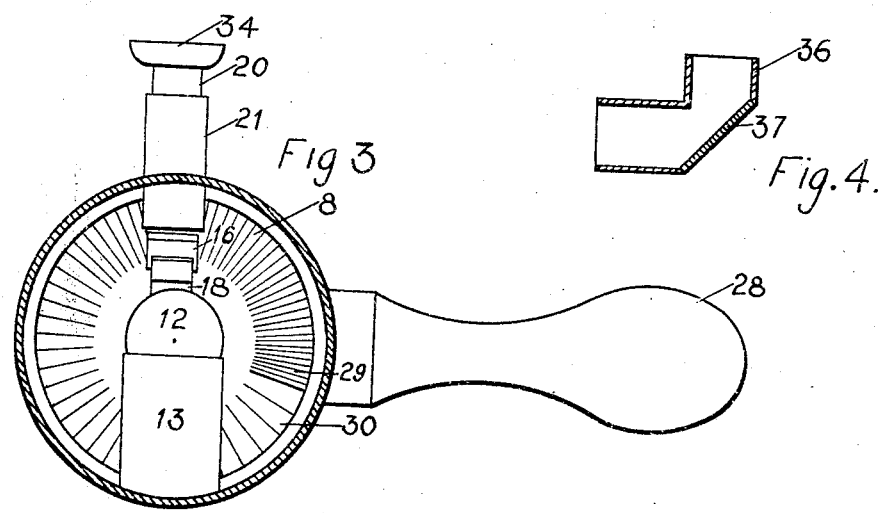
WITNESSES
INVENTOR
A. P. Little.

UNITED STATES PATENT OFFICE.

ARLINGTON P. LITTLE, OF WASHINGTON, DISTRICT OF COLUMBIA.

PHOTOMETER.

1,288,067.

Specification of Letters Patent.  Patented Dec. 17, 1918.

Application filed September 8, 1917.  Serial No. 190,373.

*To all whom it may concern:*

Be it known that I, ARLINGTON P. LITTLE, a citizen of the United States, residing at Washington, D. C., in the District of Columbia, have invented a new and useful Photometer, of which the following is a specification.

My invention relates to a photometer employing a surface rendered luminous by a self-luminous material, as the comparison screen; and has for its object a photometer capable of measuring by means of a comparison surface, rendered luminous by a self-luminous material, the apparent brightness of surfaces which are illuminated by any luminous source, and of determining, if desired, the luminous intensity of said source.

In carrying out my invention, which is not necessarily limited to the particular arrangement or construction which I have illustrated, it will be understood that the form shown may be so modified in construction and detail as will adapt it to particular conditions.

In the drawings, Figure 1 is a longitudinal section through the photometer. Fig. 2 is an end view of the photometer, with a portion of the handle cut away. Fig. 3 is a cross section of the apparatus on the line A—B of Fig. 1. Fig. 4 is a longitudinal section through an elbow attachment.

Similar characters of reference designate similar parts throughout the several views.

The cylinder-shaped casing 1 is closed at one end and over the open end of said casing is placed the cover 2. 3 is the enlarged end of a rotatable shaft 4 which shaft has one end threaded to receive nuts 5 and 6. 7, 7 are washers between which is the light-control shutter or disk 8, said disk being firmly secured to shaft 4 and rotatable therewith.

9 is a color filter, 10 a removable semi-transparent disk which is used to intercept a certain proportion of light before said light enters the photometer. 11 is a tube which passes through the cover 2 and is firmly attached thereto. 12 is a hollow sphere, held in position by the support 13, which support is fastened to the instrument case 1 by means of the screws 14. The interior of the sphere 12 is partly or entirely coated with a self luminous material, for example a mixture of radium or a radium compound and a substance which fluoresces under the bombardment of radium emanation; a phosphorescent material. 15 is an opening in the top of the sphere through which the interior of the sphere may be viewed, particularly that portion in the vicinity of 19 which constitutes the comparison screen of the photometer. 16 is a reflecting surface on which falls the light which passes through the light control disk 8. 18 is the support for the reflector 16, said support being fastened to 13 by means of the screws 17. The tube 21 passes through the case 1 and is firmly attached thereto. The sight tube 20 is movable longitudinally with respect to the tube 21. 22 is a lens secured to the inside of the tube 20. 23 is a disk or ring having an opening 24, said opening serving to limit the extent of the field seen through the sight tube. The disk 23 is held in position by means of the bent wires 25, 25. 26 is a pointer which is firmly secured to the shaft 4 and on rotating the shaft 4 the pointer 26 plays over a graduated scale 27 which is shown in Fig. 2. The handle 28 permits the photometer to be held conveniently. 31 is a short tube removably attached to tube 11 and as a translucent disk 32 fixed at its outer end. 33 is a light-shield tube, whose function is to prevent stray light from impinging on the screen 32.

The outer portion of the disk 8 passes behind the opening in the tube 11. The light transmission of this outer portion or ring is less in the region 29 than it is at 30, and the light transmission factor changes in passing around this ring from one position to another, as is indicated by the relative spacing of the radial lines on the disk 8 as shown in Fig. 3.

Fig. 4 shows an elbow 36 that may be slipped over tube 33, this elbow having a mirror 37 fastened therein and making an angle of 45 degrees with the axis of either arm of said elbow. The function of the mirror 37 is to change the direction of the light entering the elbow 36, which under certain conditions renders the photometer more convenient to use.

The wire ring 35 serves to hold the disk 10 in position.

The surface employed as the comparison screen may be of any desired shape and contour, and the self-luminous material may be held in position by any convenient means, such as coated on a surface, inclosed in a transparent container. The advantage of employing a sphere or other inclosure is to obtain a relatively high intensity of illumination on the comparison screen 19, because the light emitted by the self luminous lining of the inclosure illuminates the screen 19 as does also the light reflected from the interior surfaces. I may use in my invention either a sphere-shaped inclosure as shown, or an inclosure of any other form, or the inclosure may be omitted. The illumination on the comparison screen may be produced, if desired, entirely by light emanating from self-luminous surfaces in close proximity to said screen or the screen may be coated more or less with a self-luminous material.

Any known method may be used to control the intensity of the light falling on the screen 16.

The operation of the photometer is illustrated by the following example: Suppose it is desired to find the candle-power of a certain type of lamp. The photometer would be held in such a position that direct light from the lamp enters the tube 33 and illuminates the translucent disk 32. The disk 32 becomes a secondary source of illumination and light therefrom passes through the color filter 9 and through the light control disk 8 and illuminates the screen 16. On looking through the sight tube, which consists of eyepiece 34 and tube 20 two illuminated fields will be seen adjacent to each other, one being the screen 16 illuminated by the light from the lamp whose candle-power is to be measured, and the other being the comparison field 19. The knob 3 and the light control disk 8 which is attached thereto is then rotated until the two fields 16 and 19 are of equal brightness and the position of the pointer 26 on the scale 27 is noted. By referring to calibration data which gives the reduction factor for the type of lamp under test, the intensity of illumination falling on the surface 32 may be determined, and the candlepower of the lamp may be calculated in the usual way.

The light from self luminous compounds is practically monochromatic, hence if all colors are filtered out of the light coming from the external source of light except that corresponding to the color of the light emitted by the self luminous material, an observer will be better able to judge equality of illumination between the comparison field and the externally illuminated field than if the fields observed were of differing colors, especially when the intensity of illumination is sufficient for the eye to perceive colors distinctly. In lieu of the color-filter described, any known flicker attachment may be used.

The sight tube and tube 11 may be provided with opaque caps or other suitable means for preventing an excessive amount of light entering the photometer when it is not in use.

This instrument may also be used as an exposure meter in taking photographs, and for this purpose the scale 27 may be marked in such a way that the pointer will indicate the proper time exposure. In using the instrument the tube 33 is directed toward the object or objects to be photographed, the knurled head 3 turned until the photometer fields 16 and 19 as viewed through the sight tube are of equal brightness and then note the indication of the pointer 26 on the scale 27.

The object of the removable semi-transparent disk 10 is to absorb a certain part of the light falling upon it and thus adapt the photometer to measure illumination of a higher intensity than could be measured with the disk 10 removed.

What I claim and desire to secure by Letters Patent is:

1. In a photometer, the combination of a screen adapted to be illuminated by the light whose intensity is to be measured, a means of varying the intensity of the light falling on said screen, an indicator, a sight tube, a comparison screen and an inclosure for said screen the surface or surfaces of said inclosure supporting a self luminous material.

2. In a photometer, the combination of a screen illuminated by the light whose intensity is to be measured, means for varying the intensity of the light illuminating said screen, an indicator in connection with said means, a comparison screen, and an inclosure for said screen having an opening through which the screen may be viewed and having its inner surface coated with a self luminous material adjacent to the screen.

3. In a photometer, the combination of a screen illuminated by the light whose intensity is to be measured, means for varying the intensity of the light illuminating said screen, an indicator in connection with said means, and an inclosure having an opening in the line of vision when the illuminating screen is viewed, the inner surface of which inclosure is coated with a self luminous material to form a comparison screen.

4. In a photometer, the combination of a screen illuminated by the light whose intensity is to be measured, means of varying the intensity of the light falling upon said screen, an indicator in connection with said means, and a globe having an opening adjacent to the illuminated screen, the inner surface of which globe is coated with a self luminous material to form a comparison screen.

ARLINGTON P. LITTLE.